United States Patent
Nguyen et al.

(10) Patent No.: US 11,203,709 B2
(45) Date of Patent: Dec. 21, 2021

(54) COMPOSITIONS FOR ENHANCED OIL RECOVERY

(71) Applicant: ChampionX USA Inc., Sugarland, TX (US)

(72) Inventors: Duy T. Nguyen, Sugar Land, TX (US); Jenny L. Phan, Tomball, TX (US)

(73) Assignee: ChampionX USA Inc., Sugar Land, TX (US)

( * ) Notice: Subject to any disclaimer, the term of this patent is extended or adjusted under 35 U.S.C. 154(b) by 130 days.

(21) Appl. No.: 15/633,031

(22) Filed: Jun. 26, 2017

(65) Prior Publication Data

US 2017/0369759 A1    Dec. 28, 2017

Related U.S. Application Data

(60) Provisional application No. 62/355,385, filed on Jun. 28, 2016.

(51) Int. Cl.

| | |
|---|---|
| *C09K 8/04* | (2006.01) |
| *C09K 8/60* | (2006.01) |
| *C09K 8/86* | (2006.01) |
| *C09K 8/584* | (2006.01) |
| *C09K 8/84* | (2006.01) |

(Continued)

(52) U.S. Cl.
CPC .............. *C09K 8/04* (2013.01); *C09K 8/032* (2013.01); *C09K 8/035* (2013.01); *C09K 8/584* (2013.01); *C09K 8/60* (2013.01); *C09K 8/602* (2013.01); *C09K 8/665* (2013.01); *C09K 8/68* (2013.01);

(Continued)

(58) Field of Classification Search
CPC ........... C09K 8/584; C09K 8/60; C09K 8/602
See application file for complete search history.

(56) References Cited

U.S. PATENT DOCUMENTS

| | | |
|---|---|---|
| 2,081,876 A | 5/1937 | Prahl et al. |
| 2,227,804 A | 1/1941 | Britton et al. |

(Continued)

FOREIGN PATENT DOCUMENTS

| | | |
|---|---|---|
| CN | 101885963 A | 11/2010 |
| CN | 104650841 A | 5/2015 |

(Continued)

OTHER PUBLICATIONS

Garlits, Don, "Kerosene works as rust inhibitor," Ocala Star-Banner, Friday, Jan. 17, 1992, 1 page.

(Continued)

*Primary Examiner* — Aiqun Li
(74) *Attorney, Agent, or Firm* — Kagan Binder, PLLC

(57) ABSTRACT

Disclosed herein are compositions and methods for increasing recovery, or flowback, of hydrocarbon compounds from hydrocarbon-containing subterranean fractured rock formations (tight shale reservoirs). The flowback compositions include an anionic dimer surfactant, an anionic monomer surfactant, and a demulsifier. The flowback compositions convert oil-wet rocks to water-wet, yet exhibit a low tendency of composition components to sorb to the rock. The flowback compositions do not cause formation of emulsions with hydrocarbon compounds within the subterranean fractured rock formations. The flowback composition are useful for increasing the yield of hydrocarbons recovered from tight shale reservoirs.

8 Claims, 2 Drawing Sheets

(51) Int. Cl.
*C09K 8/03* (2006.01)
*C09K 8/035* (2006.01)
*C09K 8/68* (2006.01)
*C09K 8/66* (2006.01)
*C09K 8/80* (2006.01)

(52) U.S. Cl.
CPC ............... *C09K 8/80* (2013.01); *C09K 8/845* (2013.01); *C09K 8/86* (2013.01); *C09K 2208/12* (2013.01)

(56) References Cited

U.S. PATENT DOCUMENTS

| | | | |
|---|---|---|---|
| 2,371,207 | A | 3/1945 | Zublin et al. |
| 2,990,375 | A | 6/1961 | Steinhauer et al. |
| 3,110,683 | A | 11/1963 | Steinhauer et al. |
| 3,171,797 | A | 3/1965 | Klingenmaier et al. |
| 3,457,107 | A | 7/1969 | Mickelson et al. |
| 3,945,437 | A * | 3/1976 | Chiu ............ C09K 8/584 166/305.1 |
| 4,029,570 | A | 6/1977 | Coffman et al. |
| 4,089,803 | A | 5/1978 | Bessler |
| 4,276,933 | A | 7/1981 | Kudchadker et al. |
| 4,532,051 | A * | 7/1985 | Nuckels nee Byth ............. B01F 17/0085 166/275 |
| 4,739,831 | A | 4/1988 | Settlemeyer et al. |
| 5,035,876 | A | 7/1991 | Castellano |
| 5,060,727 | A | 10/1991 | Schramm et al. |
| 5,110,487 | A | 5/1992 | Current |
| 5,171,459 | A | 12/1992 | Kaplan |
| 5,203,411 | A | 4/1993 | Dawe et al. |
| 5,411,086 | A | 5/1995 | Burcham et al. |
| 5,501,815 | A * | 3/1996 | Man .............. C11D 1/008 510/221 |
| 5,710,121 | A | 1/1998 | Tracy et al. |
| 5,759,409 | A | 6/1998 | Knauf et al. |
| 5,851,429 | A | 12/1998 | Magyar |
| 5,854,187 | A | 12/1998 | Blum et al. |
| 5,854,189 | A | 12/1998 | Blum et al. |
| 5,922,671 | A | 7/1999 | Tracy et al. |
| 5,998,358 | A * | 12/1999 | Herdt ............ C11D 1/42 510/197 |
| 6,022,403 | A | 2/2000 | Kuo |
| 6,022,834 | A * | 2/2000 | Hsu ............. C09K 8/584 166/268 |
| 6,147,047 | A | 11/2000 | Robbins et al. |
| 6,294,093 | B1 | 9/2001 | Selvarajan et al. |
| 6,506,263 | B1 | 1/2003 | Basaly et al. |
| 6,710,022 | B1 | 3/2004 | Kwetkat et al. |
| 6,743,764 | B1 | 6/2004 | Wallick et al. |
| 6,852,152 | B2 | 2/2005 | Galasco et al. |
| 7,380,606 | B2 | 6/2008 | Pursley et al. |
| 7,566,744 | B2 | 7/2009 | Newman et al. |
| 7,615,516 | B2 | 11/2009 | Yang et al. |
| 7,655,063 | B2 | 2/2010 | Crews |
| 7,655,603 | B2 | 2/2010 | Crews |
| 7,886,824 | B2 | 2/2011 | Kakadjian et al. |
| 7,893,010 | B2 | 2/2011 | Ali et al. |
| 7,960,314 | B2 | 6/2011 | Van Zanten et al. |
| 7,989,404 | B2 | 8/2011 | Kakadjian et al. |
| 7,998,911 | B1 | 8/2011 | Berger et al. |
| 8,091,646 | B2 | 1/2012 | Quintero et al. |
| 8,746,341 | B2 | 6/2014 | Nguyen et al. |
| 8,921,298 | B2 | 12/2014 | Tyborski et al. |
| 8,950,494 | B2 | 2/2015 | Nguyen et al. |
| 8,961,807 | B2 | 2/2015 | Fu et al. |
| 2003/0032683 | A1 | 2/2003 | Spalding |
| 2003/0166472 | A1 | 9/2003 | Pursley et al. |
| 2004/0266649 | A1 * | 12/2004 | Thekkekandam ....... C11D 1/22 510/426 |
| 2005/0031653 | A1 * | 2/2005 | Kwetkat ........... A61Q 19/10 424/401 |
| 2006/0019836 | A1 | 1/2006 | Li et al. |
| 2006/0258541 | A1 | 11/2006 | Crews |
| 2006/0260815 | A1 | 11/2006 | Dahanayake et al. |
| 2007/0272277 | A1 | 11/2007 | Jeffreys |
| 2007/0293404 | A1 | 12/2007 | Hutchins et al. |
| 2008/0287324 | A1 | 11/2008 | Pursley et al. |
| 2009/0006215 | A1 | 1/2009 | Coker et al. |
| 2009/0020002 | A1 | 1/2009 | Williams et al. |
| 2009/0062153 | A1 | 3/2009 | Gray et al. |
| 2009/0149557 | A1 | 6/2009 | Talingting-Pabalan et al. |
| 2009/0200027 | A1 | 8/2009 | Kakadjian et al. |
| 2009/0281004 | A1 | 11/2009 | Ali et al. |
| 2009/0325826 | A1 | 12/2009 | Quintero et al. |
| 2010/0314118 | A1 | 12/2010 | Quintero et al. |
| 2011/0021386 | A1 | 1/2011 | Ali et al. |
| 2011/0021388 | A1 | 1/2011 | Van Zanten et al. |
| 2011/0120707 | A1 * | 5/2011 | Berger ............ C09K 8/584 166/270.1 |
| 2011/0218126 | A1 | 9/2011 | Berger et al. |
| 2011/0220353 | A1 | 9/2011 | Bittner et al. |
| 2011/0247965 | A1 | 10/2011 | Nguyen et al. |
| 2011/0281779 | A1 | 11/2011 | Weerasooriya et al. |
| 2012/0021471 | A1 | 1/2012 | Martin et al. |
| 2012/0088697 | A1 * | 4/2012 | Gatlin ............ C09K 8/38 507/102 |
| 2012/0125620 | A1 | 5/2012 | Nguyen et al. |
| 2012/0184470 | A1 | 7/2012 | Mao et al. |
| 2012/0214714 | A1 | 8/2012 | Whitwell et al. |
| 2013/0026103 | A1 | 1/2013 | Peterson et al. |
| 2013/0180723 | A1 | 7/2013 | Crick et al. |
| 2013/0261033 | A1 * | 10/2013 | Nguyen ............ C09K 8/602 507/240 |
| 2013/0261227 | A1 | 10/2013 | Nguyen |
| 2013/0292121 | A1 | 11/2013 | Penny et al. |
| 2013/0332130 | A1 | 12/2013 | Loveless et al. |
| 2014/0166537 | A1 | 6/2014 | Kremer et al. |
| 2015/0011453 | A1 | 1/2015 | Bennett et al. |
| 2015/0038470 | A1 | 2/2015 | Keasler et al. |
| 2015/0057196 | A1 * | 2/2015 | Debord ............ C09K 8/685 507/213 |
| 2015/0126417 | A1 | 5/2015 | Hatchman et al. |
| 2015/0141303 | A1 | 5/2015 | Harwell et al. |
| 2016/0251568 | A1 | 9/2016 | Do et al. |

FOREIGN PATENT DOCUMENTS

| | | |
|---|---|---|
| EP | 1639989 A1 | 3/2006 |
| GB | 1396088 | 5/1975 |
| KR | 20100107486 A | 10/2010 |
| WO | 1999052161 A1 | 10/1999 |
| WO | 199958631 A1 | 11/1999 |
| WO | 2001000760 A1 | 1/2001 |
| WO | 2009006251 A1 | 1/2009 |
| WO | 2009/127922 A2 | 10/2009 |
| WO | 2011/106287 A1 | 9/2011 |
| WO | 2013148760 A1 | 10/2013 |
| WO | 2013158989 A1 | 10/2013 |
| WO | 2014/113445 A1 | 7/2014 |

OTHER PUBLICATIONS

"Clay Stabilization", Chapter 3: Petroleum Engineer's Guide to Oil Field Chemicals and Fluids, 2012 pp. 125-148, booksite.elsevier.com/samplechapters/9780123838445/9780123838445.pdf.

NALMET 1689 Technology for Soluble Metal Control, Product Data Sheet, Bulletin B-1210, 3 pages, 2012.

International Search Report and Written Opinion dated Jun. 6, 2016 in connection with International Application No. PCT/US2016/019243.

International Search Report and Written Opinion dated Jun. 28, 2013 in connection with International Patent Application No. PCT/US2013/033994.

International Search Report and Written Opinion dated Jul. 26, 2013 in connection with International Patent Application No. PCT/US2013/037361.

Extended European Search Report dated Oct. 12, 2015 in connection with European Patent Application No. 13767501.3.

(56) References Cited

OTHER PUBLICATIONS

Patent Examination Report No. 1 dated Oct. 15, 2015 in connection with Australian Patent Application No. 2013239828.
Extended European Search Report dated Nov. 15, 2015 in connection with European Patent Application No. 13778640.6.
Galindo, T., et al. "Evaluation of Environmentally Acceptable Surfactants for Applicants as Flowback Aids", SPE International Symposium on Oilfield Chemistry, Apr. 1, 2013, pp. 1-12.
Razi, M., et al. "Effect of a Different Formulation of Demulsifiers on the Efficiency of Chemical Demulsification of Heavy Crude Oil", Journal of Chemical & Engineering Data, 56(9), Jun. 9, 2011, pp. 2936-2945.
Schramm, L.L., et al. "Surfactants and their applications", Annual Reports Section "C" Physical Chemistry, 99(1), Jan. 1, 2003, 46 pages.
International Search Report for Application No. PCT/US2017/039235, dated Sep. 19, 2017 (6 pages).
Written Opinion for Application No. PCT/US2017/039235, dated Sep. 19, 2017 (12 pages).
Calfax DBA-70, Diphenyl Oxide Disulfonate Anionic Surfactants, Retrieved from https://www.pilotchemical.com/products/calfax#calfax_dba70 on Sep. 5, 2019.
Calfax DBA-70, Pilot Chemical—datasheet, Retrieved fromhttps://polymer-additives.specialchem.com/product/a-pilot-chemicals-calfax-dba-70 on Sep. 5, 2019.
Dow Chemical Taiwan Limited, Dowfax™ C10L Solution Surfactant, Safety Data Sheet, Issue Date Aug. 26, 2019, 12 pages.
Dow Chemical Company, Dowfax Anionic Surfactants for High-Performance Products, Published Jul. 2000, 20 pages.
Horsup et al. "Breakthrough Corrosion Inhibitor Technology for Heavily Fouled Systems", Corrosion, vol. 65, No. 8, pp. 527-544, Aug. 2009.
INEOS Oxide, Technical Data Sheet, Lauryl Alcohol Ethoxylates, 2004, 4 pages.
Communication pursuant to Article 94(3) EPC in European Application No. 17736851.1, dated Feb. 21, 2020, 4 pages.
Office Action & Search Report in Colombian Application No. NC2018/0014338 dated Jul. 3, 2020, 10 pages (Official Copy Only).
Rejection Resolution Report (Resolution No. 67608), Colombian Patent Application No. NC2018/0014338, dated Oct. 26, 2020, 20 pages (12 pages English Translation and 9 pages Official Copy).

* cited by examiner

COMPOSITIONS FOR ENHANCED OIL RECOVERY

FIELD OF THE INVENTION

The present invention relates to compositions and methods for increased recovery of crude oil from a subterranean hydrocarbon-containing formation.

BACKGROUND

Hydraulic fracturing is a well-stimulation technique in which subterranean rock is fractured by a hydraulically pressurized fracturing fluid typically made by combining water, an hydraulic fracturing proppant (conventionally sand or aluminum oxide), and additive chemicals that modify subterranean flow, subterranean interfacial tension, and/or provide other effects. A hydraulic fracture is formed by pumping the fracturing fluid into a wellbore at a rate sufficient to increase pressure at the target depth to exceed that of the fracture gradient (pressure gradient) of the rock. When the hydraulic pressure is removed from the well, the hydraulic fracturing proppants lodge within the cracks to hold the fractures open. Hydrocarbon compounds such as natural gas and petroleum are recovered via the cracks in the hydrocarbon-containing deep-rock formations. Hydraulic fracturing techniques can be used to form a new well and can also be used to extend the life of an existing conventional oil well.

Chemical additives including surfactants have been added to fracturing fluids in hydraulic fracturing processes to increase recovery of hydrocarbon compounds from subterranean hydrocarbon-containing formations. The surfactants can act to lower the interfacial tension between the fracturing fluid and the oil trapped within the fractures in the reservoir and can change the wettability of the reservoir rock, thereby increasing the yield of hydrocarbon compounds released from the rock fractures. However, many conventional surfactants and surfactant blends adsorb substantially onto the rock surfaces, depleting the surfactant quickly at the expense of deeper-lying fracture surfaces. Additionally, many injected surfactants facilitate underground emulsion formation between the hydrocarbon compounds and the fracturing fluid, which retards or prevents recovery of the hydrocarbon compounds.

Further, conventional chemical surfactants and mixtures thereof are often unstable or insoluble in the high temperature and/or high total dissolved solids water sources encountered in some subterranean reservoirs. For example, in some tight shale reservoirs temperatures in excess of 60° C. are encountered; temperatures can be as high as 120° C. Additionally, native underground water, which as a term of art is referred to as "formation fluid" or "connate", is often characterized as having high total dissolved solids, such as about 2 wt % total dissolved solids and as much as about 35 wt % total dissolved solids. In some cases, a substantial portion of the dissolved solids are ionic (one or more salts). In some cases, a substantial portion of the salts are divalent salts including calcium salts, magnesium salts, or a combination thereof. High temperature and high salinity, particularly in the form of high divalent salt concentration, are highly detrimental to the solubility, chemical stability, and thus performance of many surfactants and other materials after injection. Since these detriments are encountered after injection and out of sight of the operator, it is only after injection that an operator may determine that subterranean conditions have caused the surfactants to become unstable or to precipitate, thereby damaging the reservoir for purposes of future hydrocarbon recovery.

Thus, there is a need in the industry for compositions that reduce the interfacial tension between a fracturing fluid and the oil trapped within the fractured subterranean rock formations in high temperature environments without adsorbing strongly to the rock surfaces and without forming water-oil emulsions. There is a need in the industry for compositions that accomplish the foregoing within subterranean environments that include high total dissolved solids, high temperature, or a combination thereof. There is a need in the industry for compositions that increase the yield of hydrocarbon compounds recovered from fractured subterranean rock formations including high total dissolved solids, high temperature, or a combination thereof.

SUMMARY

Disclosed herein are compositions and methods for increased recovery of crude oil from a subterranean hydrocarbon-containing formation. The compositions are thermally stable when subjected to underground conditions including temperatures of about 60° C. to 120° C. and/or water sources having high total dissolved solids. When an emulsion of the invention is injected into an oil-containing reservoir, rock contacted by the composition changes from oil-wettable to water-wettable. Yet the components of the compositions exhibit a low tendency to adsorb onto the rock. The compositions also inhibit formation of emulsions in underground fracturing fluid flows. The compositions substantially increase the yield of hydrocarbons from underground reservoirs when injected therein. The injected compositions are particularly useful to increase yield of hydrocarbons in reservoirs comprising high temperature water sources, high total dissolved solids water sources, or high temperature/high total dissolved solids water sources. The injected compositions are particularly useful to increase yield of hydrocarbons obtained from tight shale reservoirs.

The compositions of the invention are flowback compositions for increasing the flowback of a hydrocarbon product from a subterranean reservoir. In embodiments, the reservoir is a tight shale reservoir. The flowback compositions comprise, consist essentially of, or consist of (1) one or more anionic dimer surfactants; (2) one or more anionic monomer surfactants; (3) a demulsifier; and (4) a coupling agent, a water source, or a combination of two or more thereof. In some embodiments, the anionic moieties of the dimer and monomer surfactants are selected from phosphate, sulfonate, carboxylate, and mixtures thereof. In some embodiments, the anionic moieties of the dimer and monomer surfactants are substantially the same. In some embodiments, the weight ratio of dimer surfactant to monomer surfactant in the flowback composition is about 3:1 to 1:3. In some embodiments, the compositions further include one or more additives, wherein the additives are selected from clay stabilizers, corrosion inhibitors, scale inhibitors, viscosifying agents, solvents, flow back aids, friction reducers, proppants, biocides, or mixtures thereof. In some embodiments, the water source includes high total dissolved solids, high temperature, or both. In some embodiments, the coupling agent comprises, consists essentially of, or consists of In some embodiments, the water source comprises, consists essentially of, or consists of produced water.

In some embodiments, the flowback composition is a flowback concentrate, the concentrate comprising about 10 wt % to 95 wt % actives based on the weight of the concentrate, the actives comprising total of the combined dimer surfactants, monomer surfactants, and demulsifier (referred to herein as "actives") based on the weight of the flowback concentrate. In some embodiments, the flowback concentrate consists essentially of actives and a water source, such that 5 wt % to 90 wt % of the concentrate is the water source. In other embodiments, the concentrate includes actives and a coupling agent and essentially excludes water. In still other embodiments, the concentrate includes both a coupling agent and a water source. In some embodiments, the water source present in the flowback concentrate consists essentially of water or consists of water. In some embodiments, the flowback concentrate is storage stable. In some embodiments the flowback composition is a flowback injectate, the injectate comprising about 99 wt % to 99.999 wt % of a water source and about 0.001 wt % to 1 wt % actives. In some embodiments the water source is a high temperature water source, a high total dissolved solids water source, or a high temperature, high total dissolved solids water source.

Also disclosed herein is a method of increasing recovery of crude oil from a subterranean hydrocarbon-containing formation, the method comprising: forming a flowback composition, the composition comprising, consisting essentially of, or consisting of (1) one or more anionic dimer surfactants; (2) one or more anionic monomer surfactants; (3) a demulsifier; and (4) a water source, a coupling agent, or a combination of two or more thereof; contacting the flowback composition with a water source to form a flowback injectate; injecting the flowback injectate into the subterranean hydrocarbon-containing formation; and collecting a hydrocarbon from the subterranean hydrocarbon-containing formation. In some embodiments, the subterranean reservoir is a tight shale reservoir. In some embodiments, the injecting is into a first wellbore connected to the subterranean hydrocarbon-containing formation, and the collecting is from a second wellbore that is connected to the subterranean hydrocarbon-containing formation. In other embodiments, the injecting and the collecting are carried out in the same wellbore. In some embodiments, the flowback composition is a flowback concentrate comprising about 10 wt % to 95 wt % actives. In some embodiments, the water source contacts the flowback composition at a temperature of about 60° C. to 250° C., or about 60° C. to 120° C. In some embodiments, the water source comprises about 4 wt % to 30 wt % total dissolved solids. In some embodiments the contacting is carried out contemporaneously with the injecting; in other embodiments, the contacting is carried out prior to the injecting.

Also disclosed herein is the use of a composition comprising, consisting essentially of, or consisting of (1) one or more anionic dimer surfactants; (2) one or more anionic monomer surfactants; (3) a demulsifier; and (4) a water source to increase the flowback of a hydrocarbon product from a subterranean reservoir. In embodiments, the reservoir is a tight shale reservoir.

Other objects and features will be in part apparent and in part pointed out hereinafter.

DETAILED DESCRIPTION

Definitions

Figure 1:
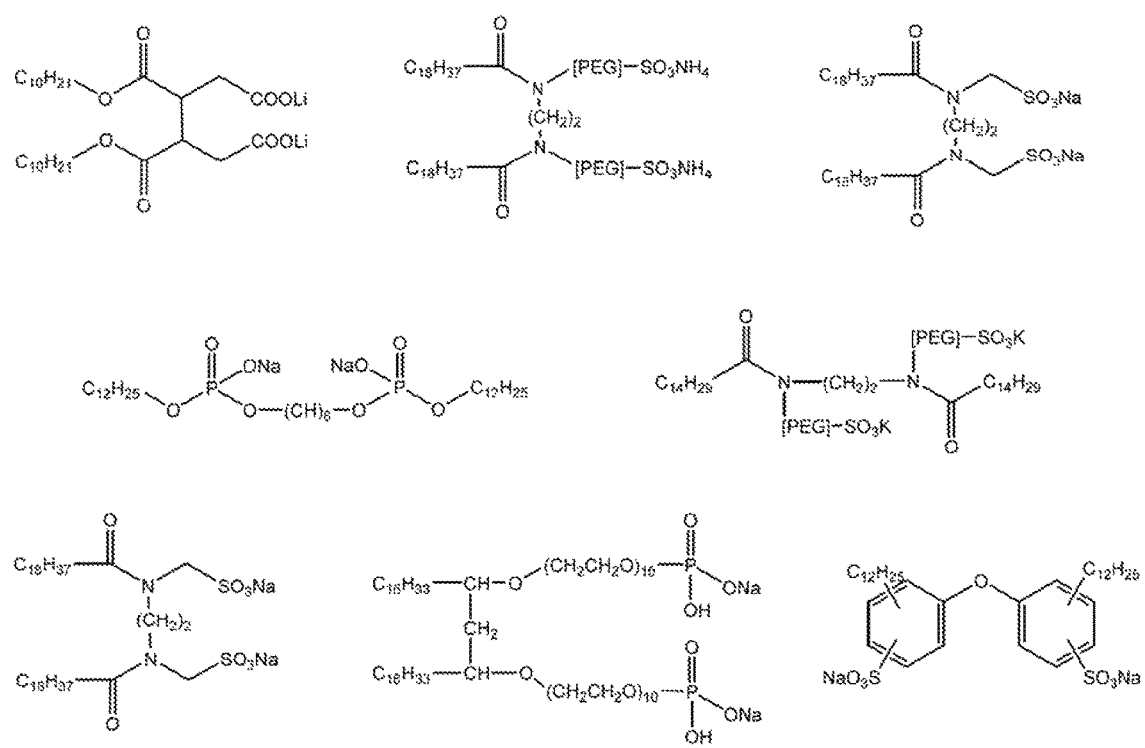
FIG. 1 is a representation of some compounds useful in the compositions and methods of the invention.

Unless otherwise defined, all technical and scientific terms used herein have the same meaning as commonly understood by one of ordinary skill in the art. In case of conflict, the present document, including definitions, will control.

As used herein, the term "dimer surfactant" or "Gemini surfactant" means a compound including two distinct hydrophobic moieties and two distinct anionic moieties covalently linked in a single compound, wherein the dimer surfactant is generally represented as $R^1R^2[S]X^1X^2$, wherein $R^1$ and $R^2$ are hydrophobic groups independently selected from linear, branched, cyclic, aromatic, or alkaromatic groups having 6 to 50 carbon atoms; $X^1$ and $X^2$ are anionic groups comprising sulfonate, carboxylate, or phosphonate salts having a counterion selected from Na, Li, K, and $NR_4$ where each R is independently selected from H or a $C_1$-$C_3$ alkyl group; and S is a spacer group, wherein $R^1$, $R^2$, $X^1$, $X^2$, and S are covalently bonded in an arrangement selected from: S is bonded to both $R^1$ and $R^2$, further wherein $R^1$ is bonded to $X^1$ and $R^2$ is bonded to $X^2$; S is bonded to both $X_1$ and $X_2$, further wherein $R^1$ is bonded to $X^1$ and $R^2$ is bonded to $X^2$; or S is bonded to all of $R_1$, $R_2$, $X_1$, and $X_2$. The structure of the spacer group is not particularly limited but generally S does not include ionic moieties or more than about 12 carbons. In embodiments, S includes one or more oxygen or nitrogen atoms; in some such embodiments, S consists of oxygen.

As used herein, the term "monomer surfactant" or "anionic surfactant" means a water soluble or water dispersible amphiphilic molecule having a single hydrophobic moiety and a single anionic group selected from sulfonate, carboxylate, and phosphonate salts and at least one associated counterion selected from Na, Li, K, and $NR_4$ where each R is independently selected from H or a $C_1$-$C_3$ alkyl group.

As used herein, the term "water source" means water substantially in a liquid state and comprising, consisting essentially of, or consisting of fresh water, tap water, well water, deionized water, distilled water, produced water, municipal water, waste water such as runoff water, "gray" water, or municipal waste water, treated or partially treated waste water, brackish water, or sea water, or a combination of two or more such water sources as determined by context; and present. In embodiments, a water source includes one or more salts, ions, buffers, acids, bases, surfactants, or other dissolved, dispersed, or emulsified compounds, materials, components, or combinations thereof. The term "produced water" refers to a water source that is present within and/or flows from a subterranean reservoir; produced water includes connate unless otherwise specified. Generally, the term "water source" includes all of the following unless otherwise specified or determined by context: water, connate, produced water, water having high total dissolved solids, water having high temperature, and water having both high total dissolved solids and high temperature. The terms "waterbased", "water solution", "aqueous" and the like generally refer to a composition including a water source.

As used herein, the term "high temperature" refers to a water source, a subterranean reservoir, or a combination thereof having a temperature of about 60° C. to 120° C., as specified or determined by context.

As used herein, the term "high total dissolved solids" refers to a water source including at least about 4 wt % solids dissolved therein, and in embodiments up to about 30 wt % solids dissolved therein. In general, "saline" or "salinity" refers to a water source wherein a portion, in some embodiments a substantial portion, the total dissolved solids are salts, as determined by context.

As used herein, the term "stable" as applied to a flowback composition means a kinetically stable composition that absent any force applied, temperature change, or chemical added, is or is capable of being substantially free of coagulation, plating out, precipitation, gross coalescence of phases (conventionally referred to as "separation") or any other evidence of instability for at least about 24 hours at about 20° C. As used herein, the term "storage stable" as applied to a flowback composition means that the composition is stable after at least six months of storage at temperatures between about −25° C. to 60° C.

As used herein, the term "tight shale reservoir", "subterranean hydrocarbon-containing fractured rock formation", and similar terms refer to a hydrocarbon-containing subterranean reservoir formed by hydraulic fracturing or "fracking".

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Compositions

Disclosed herein are flowback compositions useful for recovering hydrocarbon compounds from hydrocarbon-containing subterranean fractured rock formations. The compositions comprise, consist essentially of, or consist of (1) one or more dimer surfactants; (2) one or more monomer surfactants; (3) a water dispersible demulsifier; and (4) a water source, a coupling agent, or a combination of two or more thereof. The dimer and monomer surfactants comprise anionic moieties selected from phosphate, sulfonate, carboxylate, and mixtures thereof. In some embodiments, the anionic moieties of the dimer and monomer surfactants are the same or are substantially the same. In some embodiments, the compositions optionally further include one or more additives, wherein the additives are selected from clay stabilizers, nonionic surfactants, corrosion inhibitors, scale inhibitors, viscosifying agents, solvents, flow back aids, friction reducers, proppants, biocides, or mixtures thereof or in various combinations depending on the chemical and physical attributes of the subterranean reservoir addressed and optimization of the operator in such environments. In some embodiments, the water source is water; in some embodiments the water source is produced water.

The flowback compositions have a highly desirable balance of performance attributes for enhancing oil recovery in tight shale reservoirs such as those exploited in hydraulic fracturing. This balance is difficult to achieve and the behavior of dimer surfactants are unpredictable even when employed alone in water, making the combination of performance attributes of the present flowback compositions all the more surprising. In hydraulic fracturing, a key attribute for compositions used in enhanced hydrocarbon recovery is the ability of the flowback composition, which is injected into the reservoir, to alter the wettability of the reservoir rock from oil-wet to water-wet, while exhibiting low adsorption to the rock itself so as to minimize the rate of depletion. The present compositions achieve this result. Another key attribute for compositions used in enhanced hydrocarbon recovery in tight shale reservoirs is the ability to impart low interfacial tension to water sources comprising high salinity and/or total dissolved solids of up to about 30 wt %, yet prevent formation of emulsions with the hydrocarbon products that are the target of the recovery operation. Finally, hydraulic fracturing flowback compositions must be thermally stable within the reservoir while exhibiting all of the foregoing properties. The aqueous environment within tight shale reservoirs can include high temperature, high total dissolved solids, or both. The present compositions also achieve this result. The following descriptions of the composition include descriptions of individual components thereof, wherein any of the individual components are intended to be combined with any other individual components without limitation except where specified otherwise.

Dimer Surfactant.

In embodiments, the dimer surfactant has the structure $R^1R^2[S]X^1X^2$, wherein $R^1$ and $R^2$ are hydrophobic groups independently selected from linear, branched, alicyclic, aryl, and alkaryl groups having 6 to 50 carbon atoms; $X^1$ and $X^2$ are anionic groups independently selected from sulfonate, carboxylate, or phosphonate; and S is a spacer group. $R^1$, $R^2$, $X^1$, $X^2$ and S are covalently bonded in an arrangement selected from: S is bonded to both $R^1$ and $R^2$, further wherein $R^1$ is bonded to $X^1$ and $R^2$ is bonded to $X^2$; S is bonded to both $X_1$ and $X_2$, further wherein $R^1$ is bonded to $X^1$ and $R^2$ is bonded to $X^2$; or S is bonded to all of $R_1$, $R_2$, $X_1$, and $X_2$. The structure of the spacer group S is not particularly limited but generally S does not include ionic moieties or more than about 12 carbons. In embodiments, S includes one or more oxygen or nitrogen atoms. In embodiments, the one or more counterions are independently selected from Na, Li, K, and $NR_4$ where each R is independently selected from H or a $C_1$-$C_3$ alkyl group. In embodiments, the dimer surfactant is a blend of two or more dimer surfactants.

Any two or more, or all of the following may be aspects of the dimer surfactant and therefore combinable without limitation with the foregoing description of the dimer surfactant and its structure, and further combinable with any other components of the flowback compositions as described herein, and wherein the methods of the invention suitably employ any of the dimer surfactants and other components are recited herein. In embodiments, the dimer surfactant comprises sulfonate moieties. In embodiments, the dimer surfactant comprises sodium sulfonate moieties. In embodiments, the dimer surfactant comprises aromatic functionality. In embodiments, the dimer surfactant includes two sulfonate groups and two alkyl groups having 10 or more carbon atoms. In embodiments, one or more of the hydrophobic groups of the dimer surfactant comprise alkaryl functionality. In embodiments, both hydrophobic groups of the dimer surfactant comprise alkaryl functionality. In embodiments, the spacer group consists of an oxygen atom. In embodiments, the spacer group comprises, consists essentially of, or consists of a diphenyl ether moiety. In embodiments, the spacer group comprises, consists essentially of, or consists of an oxygen atom bonded to two aromatic groups, further wherein each aromatic group is also bonded to a hydrophobic group and an anionic group. In embodiments, the spacer group comprises, consists essentially of, or consists of an oxygen atom bonded to two aromatic groups, further wherein each aromatic group is further bonded to a hydrophobic group and also to a sodium sulfonate group. In embodiments, the dimer surfactant is a diphenyl ether disulfonate having the formula

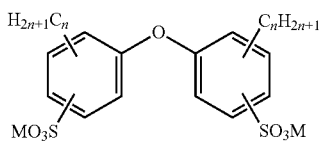

or mixtures thereof, wherein n is 6 to 22, for example 8 to 20, 8 to 18, 8 to 16, 8 to 14, 10 to 14, or 10, 11, 12, 13, or 14 carbons or mixtures thereof and M can be hydrogen in some embodiments but is preferably and substantially selected from Na, K, $NH_4$, primary ammonium, secondary ammonium, tertiary ammonium, quaternary ammonium, or mixtures thereof. In embodiments, at least one M is not hydrogen. In embodiments, n is an average number obtained by any method known to those of skill, and represents the average carbon number of the hydrophobic chains $R^1$, $R^2$.

It will be understood that the structure above is intended to convey that one hydrophobic group ($C_nH_{2n+1}$) and one sulfonate group are covalently bonded to each benzene ring, further wherein the placement of the hydrophobic group and the sulfonate group on the benzene ring differ as to between molecules in some embodiments. However, in some embodiments the dimer surfactant structure above includes, in some cases substantially includes one or more diphenyl ether disulfonates having the formula

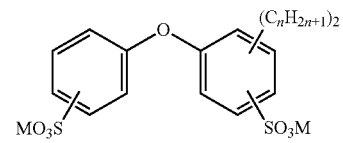

wherein hydrophobic groups $R^1$, $R^2$ (that is, both individually selected $C_nH_{2n+1}$ groups) are bonded to a single benzene ring. In some embodiments a commercial supply of dimer surfactant may include such structures.

As to between different diphenyl ether disulfonate molecules, n may be an expression of an average number of carbons per hydrophobic moiety, as determined by any of the commonly employed methods known to one of skill. Further as to between different diphenyl ether disulfonate molecules, n may be presentative of a linear, alicyclic, or branched alkyl moiety or mixtures thereof.

The dimer surfactant is blended with the monomer surfactant and demulsifier, along with a water source, a coupling agent, or a mixture of two or more thereof, to provide the flowback compositions. The amount of the dimer surfactant in the flowback compositions, expressed as a weight percent based on the total weight of actives in the flowback composition is about 20 wt % to 60 wt %, or about 25 wt % to 60 wt %, or about 30 wt % to 60 wt %, or about 35 wt % to 60 wt %, or about 40 wt % to 60 wt %, or about 20 wt % to 55 wt %, or about 20 wt % to 50 wt %, or about 20 wt % to 45 wt %, or about 20 wt % to 40 wt %, or about 20 wt % to 35 wt %, or about 20 wt % to 30 wt %, or about 30 wt % to 50 wt %, or about 30 wt % to 40 wt %. The flowback compositions are combined as concentrates or as the diluted compositions prepared for subterranean injection, wherein the weight ratio of actives remains substantially constant regardless of the total actives in a particular weight or volume comprising the actives.

Dimer surfactants are generally understood to have increased surface activity, lower critical micelle concentration (cmc), and unusual viscoelastic properties such as effective thickening when compared to conventional "monomeric" surfactant counterparts. However, the behavior of gemini surfactants is qualitatively different in several other respects from that of monomeric surfactants, posing challenges to current theories of surfactant self-assembly and providing significant unpredictability in terms of application of the dimer surfactants—particularly when combined with additional components in a blend. For example, referring to the dimer surfactant structure $R^1R^2[S]X^1X^2$, where S is $(CH_2)_m$ with m being variable ("polymethylene spacer"), the area per molecule in a saturated dimer surfactant monolayer at the water-air interface has a non-monotonous dependence on S. That is, the molecular area at the water-air interface is found to increase with increasing S length for short spacers, reach a maximum for —$(CH_2)_{12}$—, and then decrease for longer spacers. This decrease in the specific area is unexpected given the fact that the molecule becomes bigger as the length of S increases. Yet it is observed that where the spacer is PEO (polyethylene oxide) or PPO (polypropylene oxide), the area per molecule in a saturated dimer surfactant monolayer at the water-air interface has a monotonous dependence on S.

Further, the critical micelle concentration (cmc) of dimer surfactants is non-monotonous with a maximum at about m=4-6 carbons for a polymethylene spacer. Similarly, the Krafft temperature exhibits a minimum and the micellization enthalpy a maximum at about 4-6 carbons for a polymethylene spacer. Further, as parameters such as the relative size of the head and tail groups or the salt concentration are progressively increased, monomeric surfactants change their aggregate morphology in the direction of decreasing curvature, e.g., from spherical micelles to cylindrical micelles to bilayer vesicles. However, when a polymethylene spacer length in a dimer surfactant is increased, a different sequence of shapes is observed, for instance, from cylindrical micelles to spherical micelles to vesicles. Moreover, dimer surfactants with short spacers, such as a single covalent bond, exhibit uncommon aggregate morphologies in the form of branched cylindrical micelles and ring micelles. The spacer length of dimer surfactants also has an unusual effect on the phase behavior of binary surfactant-water mixtures. For dimer surfactants having a $R^1$, $R^2=C_{12}H_{25}$ (linear), for instance, the phase-diagram region corresponding to hexagonal and lamellar phases is found to shrink with increasing size of spacer group S, disappearing at spacer lengths of m=10-12 for a polymethylene spacer, then re-appearing at m≥16. In ternary systems of water-oil-dimer surfactant, the size of the microemulsion (single-phase) region in the phase diagram has a non-monotonous dependence on polymethylene spacer length with a maximum at polymethylene spacer length of m=10. Finally, dilute micellar solutions of dimer surfactants with short spacers have unusual rheological properties, such as pronounced increase in viscosity upon increase of surfactant volume fraction and shear-thickening.

The observed properties of dimer surfactants lead to significant uncertainty regarding subterranean behavior thereof in flowback compositions, which are injected underground to increase recovery of hydrocarbon compounds from fractured rock formations by affecting subterranean surfaces, further wherein the flowback composition must not result in the formation of intractable water-hydrocarbon emulsions notoriously formed during such hydrocarbon recovery operations. Subterranean environments are extremely challenging due to conditions of high temperature, high salinity, and presence of other corrosive or reactive chemical constituents within rock, connate, or both. These conditions lead to unpredictable and often unsatisfactory hydrocarbon recovery performance of injected materials; in some cases, subterranean precipitation of flowback formulations causes fouling of the well. This problem is observed most often in tight shale reservoirs, where the narrow channels provided for escape of hydrocarbons are easily plugged by any precipitates formed therein.

Despite the environmental conditions and narrow channels present in tight shale reservoirs, and despite the inherently unpredictable behavior of dimer surfactants, we have found that anionic dimer surfactants, when combined with monomeric anionic surfactants and a demulsifier as described herein (combined, "actives") provide highly desirable performance attributes for recovery of hydrocarbon compounds from hydrocarbon-containing subterranean fractured rock formations. In particular, these formulations are Monomer Surfactants.

Suitable monomer surfactants include any water soluble or water dispersible amphiphilic molecule having a single hydrophobic moiety and a single anionic group selected from sulfonate, carboxylate, and phosphonate salts having a counterion selected from Na, Li, K, and $NR_4$ where each R is independently selected from H or an alkyl group having 1 to 3 carbons. Suitable monomeric surfactants employed in the flowback compositions comprise, consist essentially of, or consist of an anionic group and one or more linear, branched, alicyclic, aromatic, or alkaryl moiety having 6 to 20 carbons, such as 8 to 20, 10 to 20, 12 to 20, 14 to 20, 10 to 18, 10 to 16, or 10 to 14 carbon atoms, or an average of 10, 11, 12, 13, 14, 15, 16, 17, or 18 carbon atoms as determined by any averaging method known to those of skill. Examples of suitable monomer surfactants include linear or branched alkylbenzene sulfonates and mixtures thereof, linear or branched alkyl sulfonates or mixtures thereof, linear or branched alkyl ether sulfonates and mixtures thereof, linear or branched alkyl phosphonates and mixtures thereof, linear or branched alkylbenzene carboxylates and mixtures thereof, linear or branched alkyl carboxylates and mixtures thereof, linear or branched alkyl ether carboxylates and mixtures thereof, combinations of two or more of the foregoing, and the like.

The monomer surfactant employed in the flowback compositions is a conventional water dispersible or water soluble anionic surfactant or a mixture of two or more thereof. Any or all of the following may be aspects of the monomer surfactant and therefore combinable without limitation, and further combinable with any other components of the flowback compositions as described herein including specific recitations of dimer surfactant mixtures with monomer surfactants. In embodiments, the monomer surfactant comprises sulfonate moieties. In embodiments, the monomer surfactant comprises sodium sulfonate moieties. In embodiments, the monomer surfactant comprises aromatic functionality. In embodiments, the monomer surfactant includes a sulfonate group and an alkyl group having 10 or more carbon atoms. In embodiments, the hydrophobic group is an alkaromatic group.

The amount of the monomer surfactant in the flowback compositions, expressed as a weight percent based on the total weight of actives in the flowback composition is about 20 wt % to 60 wt %, or about 25 wt % to 60 wt %, or about 30 wt % to 60 wt %, or about 35 wt % to 60 wt %, or about 40 wt % to 60 wt %, or about 20 wt % to 55 wt %, or about 20 wt % to 50 wt %, or about 20 wt % to 45 wt %, or about 20 wt % to 40 wt %, or about 20 wt % to 35 wt %, or about 20 wt % to 30 wt %, or about 30 wt % to 50 wt %, or about 30 wt % to 40 wt %. The flowback compositions are combined as concentrates or as the diluted compositions prepared for subterranean injection, wherein the weight ratio of actives remains substantially constant regardless of the total actives in a particular weight or volume comprising the actives. In some embodiments, the weight ratio of the monomer surfactant to the dimer surfactant in the flowback compositions is about 3:1 to 1:3, or about 3:1 to 1:2, or about 3:1 to 1:1, or about 2:1 to 1:3, or about 1:1 to 1:3, or about 2:1 to 1:2, or about 1:1.

In some embodiments, a monomer surfactant and a dimer surfactant are selected as a pair for addition to the flowback composition. In such selection, the surfactant species are selected to include the same or substantially the same hydrophilic portions, the same or substantially the same hydrophobic portions, or the same or substantially the same hydrophilic and hydrophobic portions. Thus, for example, where the dimer surfactant is a dialkyl disulfonate, the monomer surfactants may be selected to be an alkyl sulfonate.

Demulsifiers.

Optionally, one or more demulsifiers are added to improve the ability of the flowback injectates to prevent emulsions from forming within the subterranean reservoir. Where present, the demulsifiers are selected from the group comprising, consisting essentially of, or consisting of polyethylenimine alkoxylates, alkoxylated alkylphenol formaldehyde resins, alkoxylated amine-modified alkylphenol formaldehyde resins, ethylene oxide/propylene oxide copolymers, crosslinked ethylene oxide/propylene oxide copolymers, and mixtures of these. Where employed, the demulsifier is present in the flowback concentrates at about 0.01 wt % to 5 wt % based on the total weight of the flowback concentrate, for example about 0.05 wt % to 5 wt %, or about 0.1 wt % to 5 wt %, or about 0.2 wt % to 5 wt %, or about 0.3 wt % to 5 wt %, or about 0.4 wt % to 5 wt %, or about 0.5 wt % to 5 wt %, or about 0.6 wt % to 5 wt %, or about 0.7 wt % to 5 wt %, or about 0.8 wt % to 5 wt %, or about 0.9 wt % to 5 wt %, or about 1.0 wt % to 5 wt %, or about 0.01 wt % to 4.5 wt %, or about 0.01 wt % to 4.0 wt %, or about 0.01 wt % to 3.5 wt %, or about 0.01 wt % to 3.0 wt %, or about 0.01 wt % to 2.5 wt %, or about 0.01 wt % to 2.0 wt %, or about 0.01 wt % to 1.5 wt %, or about 0.01 wt % to 1.0 wt %, or about 0.5 wt % to 4 wt %, or about 0.5 wt % to 3 wt %, or about 0.5 wt % to 2 wt % based on the total weight of a flowback concentrate.

Water Source.

The water source employed to form the flowback compositions comprises, consists essentially of, or consists of water. The water source comprises 0 wt % to about 30 wt % total dissolved solids, for example about 100 ppm to 30 wt %, about 1 wt % to 30 wt %, or even about 4 wt % to 30 wt % total dissolved solids. In some embodiments, the water source consists essentially of water; this is most likely to be true with regard to the flowback concentrate compositions. In some embodiments, the water source is produced water; this is most likely to be true with regard to flowback injectate compositions. The amount of the water source employed in the flowback compositions, including but not limited to the amount of water itself, is directed by the total actives desired in the flowback composition, the presence or substantial exclusion of any coupling agents present in the flowback concentrate, and the total solids present in the water source employed.

Coupling Agents.

Suitable coupling agents optionally employed in the flowback composition of the invention comprise, consist essentially of, or consist of water miscible solvents and mixtures of two or more water miscible solvents, wherein the term "solvents" is assigned its standard meaning according to one of skill. The coupling agents do not destabilize the flowback compositions. In some embodiments, the coupling agents increase stability of the flowback compositions. In some embodiments, for example at a selected temperature, the coupling agent is fully miscible with water; that is, all possible coupling agent:water ratios may be formed without phase separation. In other embodiments, the coupling agent is miscible with water at least up to about 20:1 water: coupling agent by volume, or about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, about 1:10, about 1:20 water:coupling agent by volume, or ranges between any of these two ratios, such as between about 20:1 and 1:20, between 5:1 and 2:1, and the like.

Suitable coupling agents comprise, consist essentially of, or consist of linear, branched, or cyclic aliphatic alcohols having 1 to 6 carbon atoms, diols having 1 to 6 carbon atoms, alkyl ethers of alkylene glycols wherein the alkyl moiety has 1 to 6 carbon atoms (e.g., ethylene glycol mono-n-butyl ether) polyalkylene glycols, and mixtures thereof. Also useful as coupling agents are glycol and glycerol based acetals and ketals, such as those formed from the condensation of e.g. glycerol with formaldehyde, acetone, or oxocarboxylic acids, semialdehydes, and esters thereof such as levulinic acid or an alkyl levulinate. Examples of useful coupling agents include methanol, ethanol, glycerol, and ethylene glycol.

The total amount of coupling agents included in the flowback compositions is about 0 wt % to 20 wt % based on the total weight of a flowback concentrate; that is, the coupling agent may or may not be present in a flowback composition. Thus in some embodiments, the flowback compositions of the invention exclude or substantially exclude a coupling agent. In other embodiments, the flowback compositions include, for example, about 0.2 wt % to 20 wt % of a coupling agent, based on the wtotal weight of the flowback concentrate, or about 0.5 wt % to 20 wt %, or about 1.0 wt % to 20 wt %, or about 2.0 wt % to 20 wt %, or about 3.0 wt % to 20 wt %, or about 4.0 wt % to 20 wt %, or about 5.0 wt % to 20 wt %, or about 6.0 wt % to 20 wt %, or about 7.0 wt % to 20 wt %, or about 8.0 wt % to 20 wt %, or about 9.0 wt % to 20 wt %, or about 10 wt % to 20 wt %, or about 0.1 wt % to 19 wt %, or about 0.1 wt % to 18 wt %, or about 0.1 wt % to 17 wt %, or about 0.1 wt % to 16 wt %, or about 0.1 wt % to 15 wt %, or about 0.1 wt % to 14 wt %, or about 0.1 wt % to 13 wt %, or about 0.1 wt % to 12 wt %, or about 0.1 wt % to 11 wt %, or about 0.1 wt % to 10 wt %, or about 5 wt % to 20 wt %, or about 5 wt % to 15 wt % based on the total weight of a flowback concentrate. The coupling agent is generally not included in the list of "actives" but is present in the concentrate to promote and increase storage stability of the flowback concentrates as well as facilitate stability of the composition during dilution of the concentrates to flowback injectates without incurring instabilities such as insolubility of an active component during the dilution. Additionally, the coupling agents, where present in a flowback composition, further suppress the freezing point of the composition which is advantageous for winter storage and transportation purposes. Finally, in some embodiments the coupling agents reduce the viscosity of a flowback concentrate, increasing the pumpability and pourability of the concentrate over a range of field use temperatures.

Additives.

As described above, additives optionally included in the flowback compositions include clay stabilizers, corrosion inhibitors, scale inhibitors, viscosifying agents, solvents, flow back aids, friction reducers, proppants, biocides, or mixtures thereof or in various combinations depending on the chemical and physical attributes of the subterranean reservoir addressed and optimization by the operator in such environments.

Suitable clay stabilizers employed in the flowback compositions comprise, consist essentially of, or consist of quaternary ammonium salt polymers having weight average molecular weights of about 500 g/mol to 10,000 g/mol, choline chloride, inorganic salts, and mixtures thereof. Inorganic salts usefully employed as clay stabilizers include $KCl$, $CaCl_2$, and $MgCl_2$. Additional clay stabilizers useful in the emulsions of the invention are listed at http://booksite.elsevier.com/samplechapters/9780123838445/9780123838445.pdf.

The amount of clay stabilizer employed in the emulsions of the invention totals about 1 wt % to 25 wt % based on the total weight of a flowback concentrate, for example about 2 wt % to 25 wt %, or about 3 wt % to 25 wt %, or about 4 wt % to 25 wt %, or about 5 wt % to 25 wt %, or about 6 wt % to 25 wt %, or about 7 wt % to 25 wt %, or about 8 wt % to 25 wt %, or about 9 wt % to 25 wt %, or about 10 wt % to 25 wt %, or about 11 wt % to 25 wt %, or about 12 wt % to 25 wt %, or about 13 wt % to 25 wt %, or about 14 wt % to 25 wt %, or about 15 wt % to 25 wt %, or about 1 wt % to 24 wt %, or about 1 wt % to 23 wt %, or about 1 wt % to 22 wt %, or about 1 wt % to 21 wt %, or about 1 wt % to 20 wt %, or about 1 wt % to 19 wt %, or about 1 wt % to 18 wt %, or about 1 wt % to 17 wt %, or about 1 wt % to 16 wt %, or about 1 wt % to 15 wt %, or about 5 wt % to 20 wt %, or about 10 wt % to 20 wt % based on the total weight of a flowback concentrate.

In some embodiments, the flowback compositions include one or more corrosion inhibitors, scale inhibitors, viscosifying agents, solvents, flow back aids, friction reducers, proppants, biocides, or mixtures thereof or in various combinations depending on the chemical and physical attributes of the subterranean reservoir addressed and optimization by the operator in such environments. Such additives include those oil field additives conventionally used in hydraulic fracturing or post-primary fracturing of subterranean hydrocarbon-containing formations. In some embodiments, the additives are added to the flowback concentrates, and the resulting concentrates are stable, or even storage stable. In other embodiments, the additives are not added to the flowback concentrate, but rather are added to the subterranean reservoir contemporaneously with dilution of the flowback concentrate to form a flowback injectate, or are added to the flowback injectate after the injectate is formed.

Suitable corrosion inhibitors include sulfur-functional compounds such as mercaptoethanol, or tertiary amino compounds such as triazine as well as other mercapto and tertiary amino functionalized compounds and polymers. Suitable scale inhibitors include phosphonate compounds and acrylated polymers. In some embodiments, one or more such additives are present in an amount that is less than 1 percent by weight of a flowback concentrate. In other embodiments, each one or more additives are present at about 1 ppm to 500 ppm in a flowback injectate, for example about 2 ppm to 400 ppm, or about 3 ppm to 300 ppm, or about 4 ppm to 200 ppm, or about 5 ppm to 100 ppm of one or more additives.

In embodiments, at least a portion of a flowback concentrate is stored for a period of time prior to use. In embodiments the storage includes enclosed container storage for transportation, such as in a truck bed, rail bed, and the like. In embodiments the storage includes enclosed container storage for inventory purposes in a building or outdoor area. In embodiments the storage includes both transportation and inventory type storage. However, it is not necessary to store or transport the flowback concentrate in order to obtain a flowback injectate effective for its intended purpose. Further, it is not necessary to store or transport the flowback concentrate in order to obtain a flowback injectate that is stable. In embodiments, the flowback compositions of the invention are storage stable. In embodiments, the flowback concentrates are storage stable. In some embodiments, the flowback concentrates are storage stable for about two months to two years, or about 6 months to two years, or about 6 months to one year. In some embodiments, the flowback concentrates are storage stable at temperatures of about −25° C. to 60° C., or about −20° C. to 60° C., or about −15° C. to 60° C., or about −10° C. to 60° C., or about 0° C. to 60° C., or about −25° C. to 50° C., or about −20° C. to 50° C., or about −15° C. to 50° C., or about −10° C. to 50° C., or about 0° C. to 50° C. In some embodiments, the flowback concentrates are storage stable for about two months to two years, or about 6 months to two years, or about 6 months to one year when stored at temperatures ranging between about −25° C. and 60° C., or about −20° C. and 60° C., or about −15° C. and 60° C., or about −10° C. and 60° C., or about 0° C. and 60° C., or about −25° C. and 50° C., or about −20° C. and 50° C., or about −15° C. and 50° C., or about −10° C. and 50° C., or about 0° C. and 50° C.

The flowback compositions are suitably combined as flowback concentrates for storage and/or transportation, wherein a flowback injectate is prepared for subterranean injection by dilution of the flowback concentrate with a water source at a location near the intended site of injection. Preparation is often carried out using one or more conventional mixing apparatuses; often the mixing apparatuses are in fluid contact with one or more injection apparatuses known to those of skill in the art of subterranean fluid injection. As a term of art, the total concentration of dimer surfactant, monomer surfactant, and demulsifier in a flowback composition may be referred to as the concentration of "actives" in the composition. The weight ratios of actives and other components of the flowback compositions recited herein relate to both flowback concentrates and flowback injectates unless otherwise specified. In embodiments, the flowback concentrates include about 10 wt % to 95 wt % total actives based on the weight of the concentrate, for example about 15 wt % to 95 wt %, or about 20 wt % to 95 wt %, or about 25 wt % to 95 wt %, or about 30 wt % to 95 wt %, or about 35 wt % to 95 wt %, or about 40 wt % to 95 wt %, or about 45 wt % to 95 wt %, or about 50 wt % to 95 wt %, or about 55 wt % to 95 wt %, or about 60 wt % to 95 wt %, or about 65 wt % to 95 wt %, or about 70 wt % to 95 wt %, or about 75 wt % to 95 wt %, or about 80 wt % to 95 wt %, or about 40 wt % to 90 wt %, or about 60 wt % to 90 wt %, or about 75 wt % to 90 wt %, or about 60 wt % to 85 wt % total actives.

In embodiments, the flowback injectates include about 0.001 wt % (10 ppm) to 1 wt % total actives based on the weight of the injectate. In embodiments, the injectates comprise, consist essentially of, or consist of about 0.001 wt % to 1.00 wt % actives in a water source, for example about 0.005 wt % to 1.00 wt %, or about 0.01 wt % to 1.00 wt %, or about 0.02 wt % to 1.00 wt %, or about 0.03 wt % to 1.00 wt %, or about 0.04 wt % to 1.00 wt %, or about 0.05 wt % to 1.00 wt %, or about 0.06 wt % to 1.00 wt %, or about 0.07 wt % to 1.00 wt %, or about 0.08 wt % to 1.00 wt %, or about 0.09 wt % to 1.00 wt %, or about 0.10 wt % to 1.00 wt %, or about 0.001 wt % to 0.90 wt %, or about 0.001 wt % to 0.80 wt %, or about 0.001 wt % to 0.70 wt %, or about 0.001 wt % to 0.60 wt %, or about 0.001 wt % to 0.50 wt %, or about 0.001 wt % to 0.40 wt %, or about 0.001 wt % to 0.30 wt %, or about 0.001 wt % to 0.20 wt %, or about 0.001 wt % to 0.10 wt %, or about 0.005 wt % to 0.50 wt %, or about 0.005 wt % to 0.40 wt %, or about 0.005 wt % to 0.3 wt %, or about 0.005 wt % to 0.2 wt %, or about 0.005 wt % to 0.1 wt %, or about 0.01 wt % to 0.2 wt %, or about 0.01 wt % to 0.10 wt % actives in a water source.

Methods

The following descriptions of the methodology include descriptions of individual actions, wherein any of the individual actions are intended to be combined with any other individual actions without limitation except where specified otherwise. Further, the methods as described below are intended to be combined with the use of any of the foregoing compositions, without limitation except where specified otherwise.

In embodiments, the components of the composition are combined in any order and using any method known to those of skill in forming admixtures. Flowback concentrates are suitably formed by combining the components of the compositions described above in any order. In some embodiments, the flowback compositions are formed as concentrates, and the concentrate is enclosed in a container for transportation purposes. The concentrates are pourable or pumpable for dilution in the field. A flowback concentrate is diluted with a water source to form a flowback injectate. In some embodiments, further components are added to the injectate for purposes of hydraulic fracturing, such as proppants comprising or consisting essentially of sand or aluminum oxide, pH adjustment agents such as mineral acids or bases, or other additives incorporated by the operator for use in the specific subterranean reservoir from which a hydrocarbon is being recovered, and/or in conjunction with the specific step being carried out in the recovery of the hydrocarbon. In other embodiments, one or more such additives are included in the concentrate instead, and thus are not added by the operator in the field. The dilution of the flowback concentrate to form the flowback injectate is accomplished using a water source; in some embodiments the water source comprises, consists essentially of, or consists of produced water.

The flowback injectate is injected into a subterranean hydrocarbon containing fractured rock formation, or reservoir, where it results in increased recovery of hydrocarbon compounds from the subterranean hydrocarbon-containing formations. In some embodiments, the water source, the subterranean environment, or both are high temperature, include high total dissolved solids, or both. In some embodiments, the flowback concentrate is combined with a water source and any desired additives to produce a flowback injectate of contemporaneously with one or more subterranean injection processes; in other embodiments the combining is prior to injecting. Injection of the flowback injectates results in increased recovery of hydrocarbon compounds from tight shale reservoirs. In embodiments, the tight shale reservoirs are characterized by one or more of low permeability, low porosity, high temperature, high total dissolved solids, and in particular high divalent cation content of ambient water (present naturally in the reservoir) or produced water within the reservoir. The injecting is carried out contemporaneously with hydraulic fracturing of the subterranean rock, or after the fracturing is complete. Where the injecting is contemporaneous with the hydraulic fracturing, the injectate includes a proppant.

One method of the invention comprises, consists essentially of, or consists of forming a flowback concentrate and storing the concentrate for a period of about 1 day to two years, followed by diluting a flowback concentrate with a water source to form a flowback injectate. Another method includes injecting a flowback injectate into a well which is in contact with a subterranean hydrocarbon-containing formation, followed by collecting one or more hydrocarbon compounds from the well. The flowback injectate is effective for lowering the interfacial tension between the injectate and the hydrocarbon compounds trapped within the formation. The flowback injectate is that effective for changing the wettability of the subterranean hydrocarbon-containing formation. The flowback injectate is effective to increase the rate, the total amount, or both of hydrocarbon compounds recovered from the subterranean hydrocarbon-containing formation into which it is injected.

The methods of the invention optionally include adding one or more additives to the flowback concentrate or the flowback injectate. The additives are added prior to, or contemporaneously with injection of the flowback injectate into a subterranean reservoir. In some embodiments, produced water is contacted with a flowback concentrate of the invention to form a flowback injectate, wherein the produced water is high temperature. In some embodiments, the produced water has high total dissolved solids. In some embodiments, at the target (injectable) volume the produced water is about 90% to 99.999% of the flowback injectate volume, or about 91% to 99.999%, or about 92% to 99.999%, or about 93% to 99.999%, or about 94% to 99.999%, or about 95% to 99.999%, or about 96% to 99.999%, or about 97% to 99.999%, or about 90% to 99.99%, or about 90% to 99.9%, or about 90% to 99%, or about 90% to 98%, or about 92% to 99.9%, or about 94% to 99.9%, or about 95% to 99.9% of the flowback injectate volume. The flowback injectate optionally includes one or more additives as described above.

The flowback injectates of the invention are effective to change the wettability of subterranean rock, coated or even saturated with hydrocarbon compounds, from oil-wet to water-wet, or from mixed-wet to water-wet. Wettability is determined by measuring contact angle of a fracturing fluid on oil-saturated rock. In some embodiments, the flowback injectates of the invention result in a contact angle of less than 90° when contacted with rock previously soaked in hydrocarbon compounds such as crude oil products. In some embodiments, after about 1 second of contact with rock previously soaked in hydrocarbon compounds, contact angle of a flowback injectate of the invention is observed to be 70° or less, such as about 5° to 70°, or about 10° to 70°, or about 20° to 70°, or about 30° to 70°, or about 40° to 70°, or about 5° to 65°, or about 5° to 60°, or about 5° to 55°, or about 5° to 50°, or about 5° to 45°, or about 10° to 60°, or about 10° to 50°, or about 20° to 50°, or about 30° to 50°. In some embodiments, after about 10 seconds of contact with rock previously soaked in hydrocarbon compounds, contact angle of a flowback injectate of the invention is observed to be 50° or less, such as about 5° to 50°, or about 10° to 50°, or about 20° to 50°, or about 30° to 50°, or about 5° to 45°, or about 5° to 40°, or about 5° to 35°, or about 10° to 35°, or about 10° to 30°, or about 20° to 40°, or about 25° to 40°. In some embodiments, after about 60 second of contact with rock previously soaked in hydrocarbon compounds, contact angle of a flowback injectate of the invention is observed to be 40° or less, such as about 5° to 40°, or about T to 40°, or about 10° to 40°, or about 15° to 40°, or about 20° to 40°, or about 5° to 35°, or about 5° to 30°, or about 5° to 25°, or about 5° to 20°, or about T to 30°, or about T to 25°, or about 10° to 25°.

Additionally, the flowback injectates of the invention exhibit low critical micelle concentration (cmc) in water sources. Without wishing to be bound by theory, we believe that a lower cmc leads to less free surfactant concentration—particularly when the flowback concentrates are diluted to form flowback injectates—and less free surfactant in the fracturing fluids leads to less adsorption onto rock surfaces. In embodiments, the flowback injectates of the invention exhibit cmc at about 500 ppb to 5 ppm actives in a 22% brine water source and in the presence of crude oil, or about 750 ppb to 5 ppm, or about 1 ppm to 5 ppm, or about 1.5 ppm to 5 ppm, or about 500 ppb to 4 ppm, or about 500 ppb to 3 ppm, or about 500 ppb to 2 ppm, or about 1 ppm to 4 ppm, or about 1 ppm to 3 ppm, or about 2 ppm actives in a flowback injectate employing a 22% brine water source as diluent and in the presence of crude oil.

We have further found that the flowback injectates of the invention do not induce formation of emulsions when injected into subterranean reservoirs. As a measure of this property, we have found that where equal parts of a flowback injectate of the invention is thoroughly mixed with a hydrocarbon compound or mixture thereof using a high shear mixing apparatus designed to form emulsions, the mixture separates rapidly once shear is stopped. In some embodiments, such mixtures separate completely within about 1 minute to 5 minutes, or about 1 minute to 4 minutes, or about 1 minute to 3 minutes, or about 2 minutes to 5 minutes, or about 2 minutes to 4 minutes.

In some embodiments, the subterranean hydrocarbon-containing formation addressed by the flowback injectates of the invention is a sandstone reservoir or a carbonate reservoir. In some embodiments, the injection of flowback injectate is carried out after hydraulic fracturing of the well. In other embodiments, the injection of flowback injectate is carried out during hydraulic fracturing of the well. The methods of the invention are particularly useful when the reservoir has low permeability, low porosity, oil-wet wettability, high temperature, and/or high total dissolved solids water sources, and/or when there is a high concentration of divalent cations in the produced water.

The flowback compositions of the invention are also suitably employed in one or more steam assisted gravity drainage (SAGD) processes. SAGD is an enhanced oil recovery technology for producing heavy crude oil and bitumen. It is an advanced form of steam stimulation in which a pair of parallel horizontal wells are drilled into a subterranean reservoir, one a few meters above the other. High pressure steam is continuously injected into the upper wellbore to heat the oil and reduce its viscosity, causing the heated oil to drain into the lower wellbore, where it is pumped out. In such processes, the flowback injectates of the invention are usefully injected along with the steam to affect subterranean wettability, surface tension, and the like.

Having described the invention in detail, it will be apparent that modifications and variations are possible without departing from the scope of the invention defined in the appended claims. The following non-limiting examples are provided to further illustrate the present invention.

EXPERIMENTAL

Example 1

The following components were admixed to form a flowback concentrate composition example 1, or E1:

| | |
|---|---|
| Didecyl diphenyl ether disulfonate, sodium salt | 39% |
| C14 alpha olefin sulfonate, sodium salt | 39% |
| Methanol | 20% |
| Crosslinked ethylene oxide/propylene oxide polymer | 1% |
| Polyethylene imine ethoxylate | 1% |

The following components were admixed to form a control composition, C1, which was previously reported in U.S. patent application Ser. No. 15/052,439 to be useful as a flowback aid for tight shale reservoirs:

| | |
|---|---|
| Nonylphenol ethoxylates (HLB of about 13) | 2.4 wt % |
| Castor oil ethoxylate (HLB of about 11.5) | 0.8 wt % |
| Methanol | 10.8 wt % |
| Cocoamidopropyl betaine | 9.6 wt % |
| Water | 58.8 wt % |
| Choline chloride | 15.0 wt % |
| C12-14 alcohol ethoxylate (HLB of about 8) | 0.2 wt % |
| Ethylene oxide/propylene oxide copolymer | 0.8 wt % |
| Polyethylene imine ethoxylate | 1.0 wt % |

Both E1 and C1 were observed to be stable and transparent. Then E1 and C1 were diluted to 0.1 wt % actives by adding Bakken formation brine (produced water having 28% total dissolved solids) followed by stirring. The diluted E1 and C1 were heated to 115° C. and observed for precipitation and other signs of phase separation or instability. A composition that remains transparent under these conditions with no visible cloudiness or other signs of phase separation is considered to have sufficient aqueous stability to be used as an injectate. E1 and C1 were further compared to 0.1 wt % of some of the individual components thereof in Bakken formation brine as well as components reported by past practitioners to be useful as flowback aids in one or more injectates for tight shale reservoirs. Results are reported in Table 1.

TABLE 1

Stability of 0.1 wt % active compositions in Bakken formation brine at 115° C.

| Composition | Observations |
|---|---|
| C12 alcohol ethoxylate having an average of 14 EO | Separated |
| Nonylphenol ethoxylate having more than 12 EO | Separated |
| Ethylene oxide/propylene oxide copolymer having an average number of 14 repeat units | Separated |
| C14-C16 olefin sulfonate | Separated |
| Dicocodimethyl ammonium chloride | Separated |
| E1 | Clear |
| C1 | Clear |
| Lignin (obtained from MeadWestvaco of Richmond, VA) | Separated |
| C12-C14 phosphate ester | Separated |
| Castor oil ethoxylate having 20-40 EO | Separated |
| C12-C14 alcohol ether sulfonate | Separated |

Example 2

Bakken reservoir rock core plugs were weighed, saturated with Bakken oil (a hydrocarbon compound mixture) and stored for at least 4 days at ambient pressure to achieve oil wet status. Then excess oil was wiped from the plugs, and the plugs were reweighed; the density of the oil was determined in order to calculate the volume of oil taken up by the rock cores. The cores were then placed with all faces open in glass imbibition cells having precision graduations in 0.1 mL. For each of the following tests, two rock core plugs were tested.

An aliquot of E1 was diluted to 0.1 wt % actives with Bakken formation brine similarly to the procedure of Example 1. An imbibition cell was filled with a volume of the diluted E1, then placed in a heated bath set at a temperature of 115° C.; after equilibration at this temperature, the oil-saturated plug was placed in the imbibition cell. Displaced oil from the plug formed a separated liquid a layer on top of the diluted E1, quantifiable as displaced volume. The cell was allowed to remain in the heated bath for up to 500 hours or until displacement of oil, measured by the volume graduations of the imbibition cells, was observed to stop. The volume of oil measured was used to calculate the % Original Oil in Place (OOIP) oil recovery, which is the percent of oil volume measured in the test as a percent of the volume of oil taken up by the rock cores prior to initiation of the test.

Figure 2:
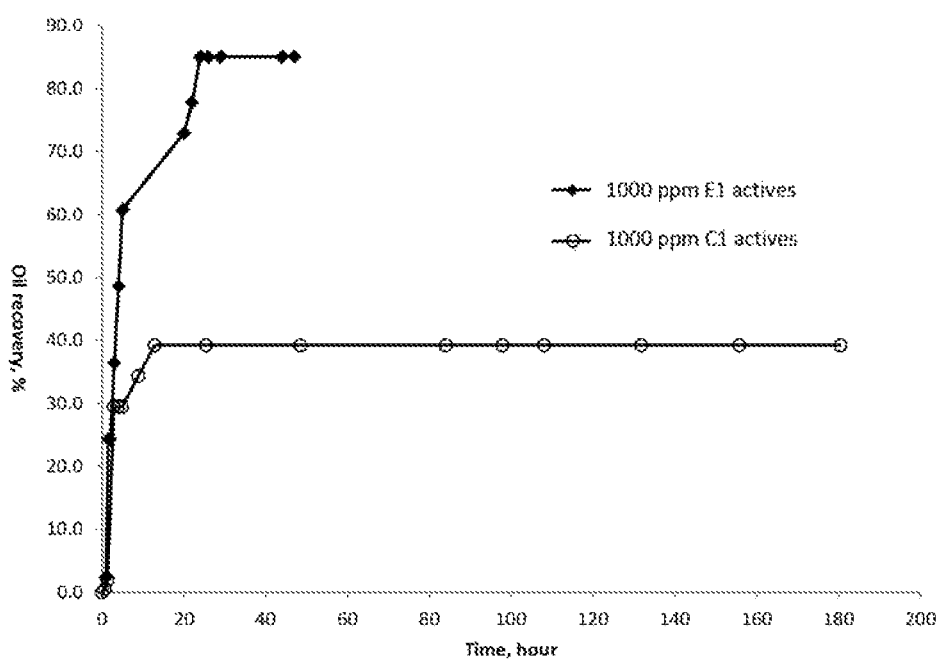
FIG. 2 is a plot showing percent oil recovered from oil saturated rock samples using a composition of the invention (E1) compared to a control composition (C1).

The experiment was repeated with C1. FIG. 2 shows the oil recovery results as volume of oil displaced for the E1 and C1 diluted compositions.

Example 3

Bakken cores were saturated with the Bakken oil at 900 psi (6205 kPa), 115° C. for 7 days or longer, then the surface oil was wiped off. A drop of a test material was placed on the core and the contact angle was measured as a function of time after drop placement using a goniometer. A comparative experiment was run with 4% brine alone. Additionally, the sulfobetaine and alcohol ether sulfonate employed in Example 2 were added at 0.1 wt % in 4% brine and contact angle measurements carried out with these surfactants solutions. All measurements were made at 25° C. Results are shown in Table 2.

TABLE 2

Contact angle at 25° C. as a function of time for the indicated materials deposited on the surface of Bakken cores saturated with Bakken oil.

| | Contact angle, ° | | | | | | | |
|---|---|---|---|---|---|---|---|---|
| Material tested | 0.1 sec | 1 sec | 3 sec | 10 sec | 60 sec | 80 sec | 120 sec | 150 sec |
| 4% brine | 121.6 | 120.2 | 111.3 | 101.4 | 91.6 | 87.7 | 85.7 | 85.6 |
| C1 | 47.0 | 44.0 | 39.2 | 32.6 | 17.7 | 13.0 | 7.1 | 4.6 |
| E1 | 31.8 | 20.1 | 18.6 | 10.9 | N/A | N/A | N/A | N/A |
| Alcohol ether sulfonate (see U.S. Pat. No. 7,629,299) | 80.2 | 78.5 | 75.4 | 67.2 | 45.9 | 42.4 | 37.6 | 33.2 |
| Sulfobetaine see (WO 2014/088817) | 75.0 | 73.3 | 69.6 | 60.8 | 43.8 | 41.4 | 38.5 | 36.4 |

Example 4

A control composition, C2, was formed using the same components and weight ratios as C1, but without the low HLB surfactant (C1214 alcohol ethoxylate, HLB~8). The diluted C2 is compared to C1 and E1 in a test designed to compare the ability of various materials to prevent emulsion formation when contacted with residual oil. The concentrates corresponding to E1, C1, and C2 were added to 4% KCl having pH adjusted to 11 to form 0.1 wt % active compositions. Twenty five (25) ml of 4% KCl containing a test material was mixed with twenty five (25) ml of oil obtained from Bakken and blended at 14,000 rpm in a Waring Blender at 90° C. for 1 minute. The mixture was then poured into a 6-oz glass prescription bottle to observe the water breakout from the emulsion. Table 3 shows the results of the observations, wherein 100% breakout indicates complete separation of the liquids.

TABLE 2

Emulsion breakout at 90° C.

| Material added to brine | Gallons of Material per 1000 gallons of brine, based on active | % Breakout | | |
|---|---|---|---|---|
| | | 1 min | 2 min | 3 min |
| None | 0 | 44 | 93 | 93 |
| C1 | 1 | 83 | 83 | 92 |
| C2 | 1 | 33 | 50 | 67 |
| Alcohol ether sulfonate (U.S. Pat. No. 7,629,299) | 1 | 1 | 2 | 2 |
| Sulfobetaine (WO 2014/088817) | 1 | 50 | 60 | 67 |
| E1 | 1 | 88 | 100 | 100 |

Example 5

C1 and E1 were diluted to 1000 ppm (0.1 wt %) in 4% brine and 22% brine. Interfacial tension (IFT) was measured for the diluted compositions against Bakken oil at 80° C. using a spinning drop tensiometer. Table 3 shows the interfacial tension (IFT) of E1 and C1 as measured, further compared to a blank (no additives to the brine).

TABLE 3

IFT against Bakken oil at 80° C.

| Composition added | Concentration, ppm | 4% TDS brine | 22% TDS brine |
|---|---|---|---|
| None | N/A | 14.23 | 22.16 |
| C1 | 1000 | 1.54 | 1.45 |
| E1 | 1000 | 2.17 | 1.96 |

What is claimed:

1. A flowback composition comprising:
an anionic dimer surfactant selected from the group consisting of a compound having the formula

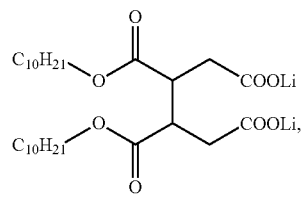

a compound having the formula

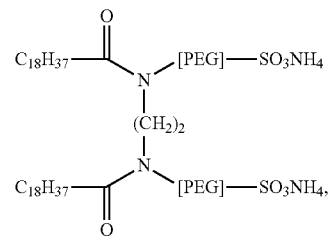

a compound having the formula

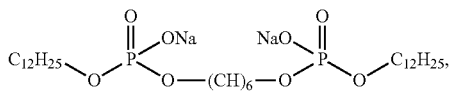

a compound having the formula

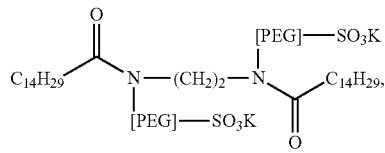

a compound having the formula

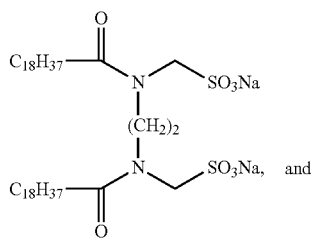

a compound having the formula

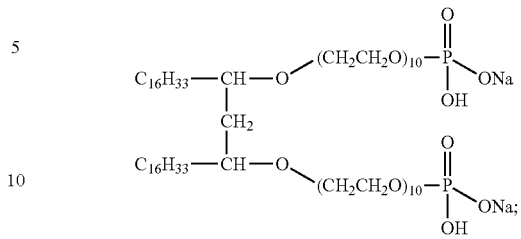

an anionic monomer surfactant; and
a water source, or a combination of the water source and a coupling agent, wherein the flowback composition is a flowback injectate, the injectate comprising about 99 wt % to 99.999 wt % of the water source, and wherein the water source is a produced water.

2. The flowback composition of claim 1 wherein the anionic moieties of the anionic monomer surfactant are selected from the group consisting of phosphate, sulfonate, carboxylate, and mixtures thereof.

3. The flowback composition of claim 1 wherein the anionic moiety of both the anionic dimer surfactant and the anionic monomer surfactant is sulfonate.

4. The flowback composition of claim 1 wherein the weight ratio of anionic dimer surfactant to the anionic monomer surfactant is about 3:1 to 1:3.

5. The flowback composition of claim 1 further comprising one or more clay stabilizers, proppants, or mixtures thereof.

6. The flowback composition of claim 1, wherein the flowback composition comprises the combination of the water source and the coupling agent, and wherein the coupling agent is selected from the group consisting of linear, branched, or cyclic aliphatic alcohols having 1 to 6 carbon atoms, diols having 1 to 6 carbon atoms, alkyl ethers of alkylene glycols wherein the alkyl moiety has 1 to 6 carbon atoms, polyalkylene glycols, and mixtures of two or more thereof.

7. The flowback composition of claim 1, wherein the flowback composition comprises the combination of the water source and the coupling agent.

8. The flowback composition of claim 7 wherein the flowback composition is storage stable.

* * * * *